United States Patent [19]
Laiho

[11] Patent Number: 6,097,942
[45] Date of Patent: Aug. 1, 2000

[54] METHOD AND APPARATUS FOR DEFINING AND UPDATING MOBILE SERVICES BASED ON SUBSCRIBER GROUPS

[75] Inventor: Keijo Tapio Laiho, Espoo, Finland

[73] Assignee: Telefonaktiebolaget LM Ericsson, Stockholm, Sweden

[21] Appl. No.: 08/933,513

[22] Filed: Sep. 18, 1997

[51] Int. Cl.⁷ .................................................. H04M 03/42
[52] U.S. Cl. .......................... 455/414; 455/416; 455/433; 455/518; 455/519
[58] Field of Search ..................................... 455/518, 519, 455/520, 433, 435, 414, 415, 416, 417, 422

[56] References Cited

U.S. PATENT DOCUMENTS

| | | |
|---|---|---|
| 4,723,264 | 2/1988 | Sasuta et al. . |
| 5,251,249 | 10/1993 | Allen et al. . |
| 5,440,541 | 8/1995 | Ichiro et al. . |
| 5,479,481 | 12/1995 | Koivunen . |
| 5,490,201 | 2/1996 | Moberg et al. . |
| 5,537,594 | 7/1996 | Shannon et al. . |
| 5,561,854 | 10/1996 | Antic et al. ................................. 455/9 |
| 5,564,068 | 10/1996 | Nguyen . |
| 5,577,264 | 11/1996 | Tuohino . |
| 5,752,196 | 5/1998 | Ahvenainen et al. .................. 455/518 |
| 5,787,343 | 7/1998 | Iijima et al. ............................ 455/414 |
| 5,832,086 | 11/1998 | Rosauer ................................. 455/519 |

FOREIGN PATENT DOCUMENTS

| | | |
|---|---|---|
| 95/13686 | 5/1995 | WIPO . |
| 96/13949 | 5/1996 | WIPO . |

OTHER PUBLICATIONS

GSM Specification 09.02, Mobile application part (MAP) signalling system for digital mobile communications network inter–node interface (DMNI) for PDC (JJ–70.10), pp. 34–115.

Primary Examiner—Lee Nguyen
Attorney, Agent, or Firm—Nixon & Vanderhye P.C.

[57] ABSTRACT

New services and/or new subscribers are efficiently and flexibly defined and added to a mobile communications network using service groups and service group identifiers. One or more groups of mobile subscribers are defined, and a group identifier is assigned to each member of the group. One or more services are established for the group of mobile subscribers and are associated with the group identifier. In particular, the group identifier links each member of the group with the established services. Using this service group approach, existing mobile communications system nodes are readily updated with new service and subscriber information. Likewise, subscriber service information may be easily restored to corrupted mobile databases. Advantageously, the signaling and time required to perform location update procedures as mobile units move between different location areas in a mobile communications system are considerably reduced.

49 Claims, 10 Drawing Sheets

METHOD AND APPARATUS FOR DEFINING AND UPDATING MOBILE SERVICES BASED ON SUBSCRIBER GROUPS

FIELD OF THE INVENTION

The present invention relates to providing services in a mobile communications network, and more particularly, to defining and updating such services based upon groupings of mobile subscribers.

BACKGROUND OF THE INVENTION

A primary characteristic of a mobile communications system, such as a cellular telephone system, is the fact that subscribers to the system may move around. Such systems are typically realized as a network of neighboring radio cells which together provide complete coverage of the area to be serviced. Mobile radios belonging to the system are allowed to roam freely within the area of the system from one cell to another. One well-known digital mobile radio system is the Global System for Mobile communication (GSM).

In cellular radio networks like the GSM, a Home Location Register (HLR) stores location and subscriber data of mobile radios registered in the network. When a person subscribes to receive a service from a cellular network operator, the subscription is entered into the HLR of that operator. The location information of moving mobile communications units are periodically updated in the HLR. In addition to the HLR, Visiting Location Registers (VLRs) temporarily store and retrieve location and subscription information for visiting mobile subscribers. Various information (sometimes in considerable amounts) is passed between the HLR and the VLRs, e.g., subscriber's service subscriptions when mobile subscribers are roaming either in a home network or in a visited network.

When new services or new subscribers are introduced into a mobile communications system, those new services and/or subscribers must be defined in the HLR, and thereafter, the HLR must update the VLRs with the new service and/or subscriber information. Typically, new services are added to the HLR and updated in VLRs on an individual subscriber basis. If one new service is added and there are 5,000 subscribers to receive the new service, the same information must be defined and transmitted 5,000 times for each subscriber. In this kind of situation, large amounts of data must be transferred between various mobile network nodes when new services and/or subscribers are introduced. These large data transfers place a high signaling demand on the limited communication resources between the network node and also take considerable time to accomplish.

There are also situations in which large blocks of data stored in an HLR, a VLR, or other database may be lost or otherwise corrupted, e.g., as a result of a temporary power loss. In such situations, the corrupted database must be reinstated and updated from some other uncorrupted node or nodes, having accurate mobile subscriber identification, location, and service subscription information corresponding to the data which was lost or otherwise corrupted. The usual approach to restoring such information is on a subscriber-by-subscriber basis. Again, this means that the data restoration process requires considerable signaling between the corrupted and uncorrupted database nodes as well as considerable time to complete the restoration.

Related problems occur in location update procedures when a mobile unit moves to a new location area serviced by a new VLR. Typically, a location area change usually requires that some subscriber service data associated with the mobile unit be transferred to the new VLR. Depending upon the number of services subscribed to by that mobile unit, this data transfer from the HLR to the new VLR of the pertinent service information for this mobile unit may be significant. This problem is further magnified given the significant number of location update procedures performed for large numbers of roaming mobile units in metropolitan areas.

What is needed is a procedure that more readily permits new services and subscribers to be added to a mobile communications system with minimal signaling overhead. In general, data transfers between mobile communications system nodes must be performed efficiently and in a relatively short time.

SUMMARY OF THE INVENTION

It is an object of the present invention to overcome the drawbacks and solve the problems noted above.

It is a further object of the present invention to efficiently and flexibly add new services and new subscribers to a mobile communications system.

It is an object of the present invention to efficiently and flexibly update existing nodes with new service and subscriber information.

It is an object of the present invention to efficiently and flexibly restore subscriber service information to corrupted nodes in a network.

It is an object of the present invention to minimize the signaling and time required to perform location update procedures as mobile units move between different location areas in a mobile communications system.

These and other objects of the present invention are achieved in the present invention based upon mobile subscriber groups. In particular, one or more groups of mobile subscribers are defined, and a group identifier is assigned to each member of the group. One or more services are established for the group of mobile subscribers and are associated with the group identifier. In particular, the group identifier links each member of the group with the established service(s).

Such a subscriber group may be defined in a mobile communications database. A first section of that database stores mobile subscriber data records each of which includes a mobile subscriber identifier, location information, and for members of a subscriber group, the corresponding subscriber group identifier. A second section of the database stores mobile services established for various groups of mobile subscribers. The group identifier links each group member's subscriber record stored in the first database section with the corresponding group services stored in the second database section. When a call is placed to a mobile subscriber and the mobile subscriber's identification number is determined, the group identifier stored in that subscriber's record links the subscribed services to that subscriber.

As a result of this separation of subscriber specific information from groups of mobile subscribers, a new service may be readily and efficiently provided to each group member simply by associating the new service with the group identifier, i.e., adding the new service to the specific group stored in a second database section. Similarly, a new member may be readily added to a service group, and thereby receive all of that group's associated services, simply by including the group identifier in the new subscriber's mobile subscriber database record.

Service information at another database may be readily added and updated simply by sending service or subscriber information and updates along with a corresponding group identifier. As a result, a new service can be added to the other database for a large number of subscribers without having to repeatedly send the same new service information to the other database for each subscriber. Instead, the service is sent just once with a list of group identifiers. The service is simply added to the corresponding groups of services provided to the subscriber members of those listed groups.

As mentioned above, service and subscriber updating procedures often occur when an HLR sends new service information to one or more VLRs. Similar updating procedures also occur when a redundant or backup HLR is employed. Each time new information is added to a primary HLR, the primary HLR updates the redundant HLR with that new information. The redundant HLR updating process is considerably simplified using group identifiers in accordance with the present invention. For example, the primary HLR simply transmits to the redundant HLR the new service to be added along with the service group identifier.

Likewise, when data stored in a mobile communications database is lost, the process of restoring mobile subscriber service information to that database is considerably simplified in accordance with the present invention. Each group of service information need only be restored once since each subscriber record includes the necessary group identifier referencing those services.

In another embodiment of the present invention directed more to individual services rather than established groups of subscribers, a service identifier is assigned to a new service to be supported by a mobile radio communications system. The new service is established for a plurality of mobile subscribers using that service identifier. Rather than storing the service itself in each subscriber record, the new service is provided to the mobile subscribers by incorporating the service identifier into the mobile subscriber database records of each mobile subscriber subscribing to the new service. This approach becomes increasingly beneficial as the number of services added increases.

BRIEF DESCRIPTION OF THE DRAWINGS

These and other objects, advantages, and features of the invention will be more fully understood by reading the following detailed description in conjunction with the drawings in which like reference numerals refer to like elements throughout in which.

DETAILED DESCRIPTION OF THE DRAWINGS

In the following description, for purposes of explanation and not limitation, specific details are set forth, such as particular embodiments, data flows, signaling implementations, interfaces, techniques, etc. in order to provide a thorough understanding of the present invention. However, it will be apparent to one skilled in the art that the present invention may be practiced in other embodiments that depart from these specific details. For example, while the present invention is described in the context of an example cellular telephone network using GSM terminology, those skilled in the art will appreciate that the present invention can be implemented in any cellular telephone system. In other instances, detailed descriptions of well-known methods, interfaces, devices, and signaling techniques are omitted so as not to obscure the description of the present invention with unnecessary detail.

Figure 1:
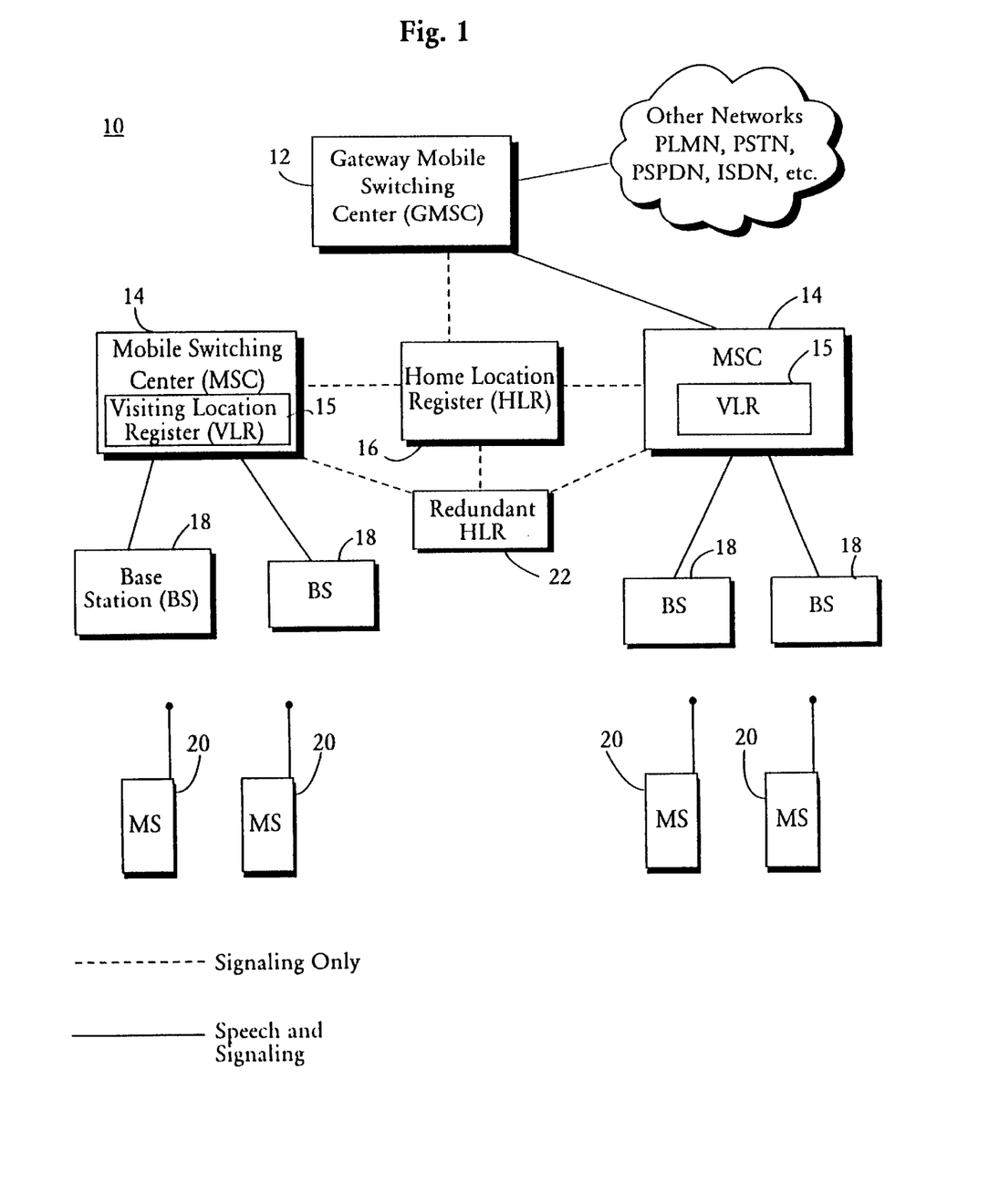
FIG. 1 is a function block diagram of a mobile communications system in which the present invention may be advantageously employed.

FIG. 1 illustrates an example mobile communications system 10 in which the present invention may be implemented. Mobile communications system 10 includes a gateway mobile switching center (GMSC) 12 which interfaces with other telecommunications networks such as the public switched telephone network (PSTN), ISDN, packet switched data network (PSDN), etc. The gateway mobile switching center 12 is connected to one or more other mobile switching centers (MSC) 14 provided in the mobile communications system 10. The gateway MSC is the point in the public land mobile radio network (PLMN) 10 where calls to mobile subscribers enter. Therefore, each mobile terminating call must be routed via the GMSC 12. The GMSC 12 contains signaling functions for retrieving information from a primary home location register (HLR) 16 which is needed for a mobile terminating call setup. Based on the results of the interrogation to identify the MSC/VLR currently serving the called mobile station, the call is routed by the GMSC 12 to the serving MSC 14. While the GMSC is shown as a separate node for clarity of illustration, it can be co-located with a MSC/VLR node.

Each mobile switching center 14 performs telephony switching functions associated with calls involving at least one mobile or portable communications unit indicated as mobile stations (MS) 20 in FIG. 1. Included with each mobile switching center 14 is a visiting location register (VLR) 15 which includes a database containing information about all mobile stations currently located in that MSC's service location area. The VLR 15 contains temporary subscriber information needed by the MSC 14 to provide services to visiting/roaming mobile subscribers. When a mobile station roams into a new MSC service location area, the VLR associated with that location area requests data about the mobile station from the home location register and stores it. Thus, if the roaming mobile station makes a call, the VLR already has the information needed for call setup. The visiting location register 15 may also be a stand-alone node. But in the presently preferred example embodiment, the VLR 15 is integrated with the MSC 14 to eliminate signaling between the two nodes over a network, i.e., internal signaling is used thereby decreasing the signaling load over the network.

The home location register 16 is a database node that stores and manages subscriptions. For each "home" mobile subscriber, the HLR contains permanent subscriber data such as a Mobile Station ISDN number (MSISDN) which uniquely identifies the mobile telephone subscription in the public switched telephone network numbering plan and an International Mobile Subscriber Identity (IMSI) which is a unique identifying entity allocated to each mobile subscriber and is used for all signaling in the PLMN 10. All network related subscriber information is connected to the IMSI. The HLR stores location information for each mobile subscriber unit, e.g., a VLR number. The HLR 16 also contains a list of both basic and any supplementary services which a mobile subscriber is authorized to use along with a current subscriber location number corresponding to a VLR address. The manner in which those services are stored and the way in which services are linked to individual subscribers is described in detail below. The HLR may be integrated in the same node as the MSC/VLR or can be implemented as a separate node as indicated in the example embodiment shown in FIG. 1. A redundant HLR 22 is periodically updated by the primary HLR 16 so that the redundant HLR 22 may function as the primary HLR should there be some problem with HLR 16.

Once the serving MSC/VLR node is identified, a call intended for one of the mobile stations 20 is routed by that serving MSC/VLR to the base station 18 associated with the cell in which the called mobile station 20 is currently located. Using well-known, established protocols and procedures, the call is forwarded over the radio interface by that base station 18 to the called mobile station 20.

The general procedure for routing a call to a mobile station in the PLMN 10 is now described. Assume for example that a call is placed from a calling party "A" to a called party "B" corresponding to one of the mobile stations 20 in PLMN 10. Thus, the numbered dialed by "A," i.e., the mobile station ISDN number (MSISDN), is analyzed in a PSTN exchange which determines that the call is for a mobile subscriber. The call is routed to the nearest GMSC 12 in the home PLMN 10 of the called mobile B.

After analyzing the MSISDN for the routed call, the GMSC 12 sends a signaling message to the HLR 16 requesting information to be used to route the call to the serving MSC/VLR where the mobile station is temporarily registered. Using the MSISDN, the HLR 16 retrieves the IMSI and a data record for the mobile subscriber B. Since the address of the serving VLR for this mobile was received when the mobile registered in the PLMN 10, the HLR 15 contacts the serving VLR to obtain a roaming number. The VLR sends the roaming number to the HLR 15, and the HLR forwards the roaming number to the GMSC 12 which enables the GMSC to then route the actual call to the serving MSC 14. Since the MSC knows the location area where the mobile station is located, it sends a paging message and the call to the mobile in accordance with known procedures.

Figure 2:
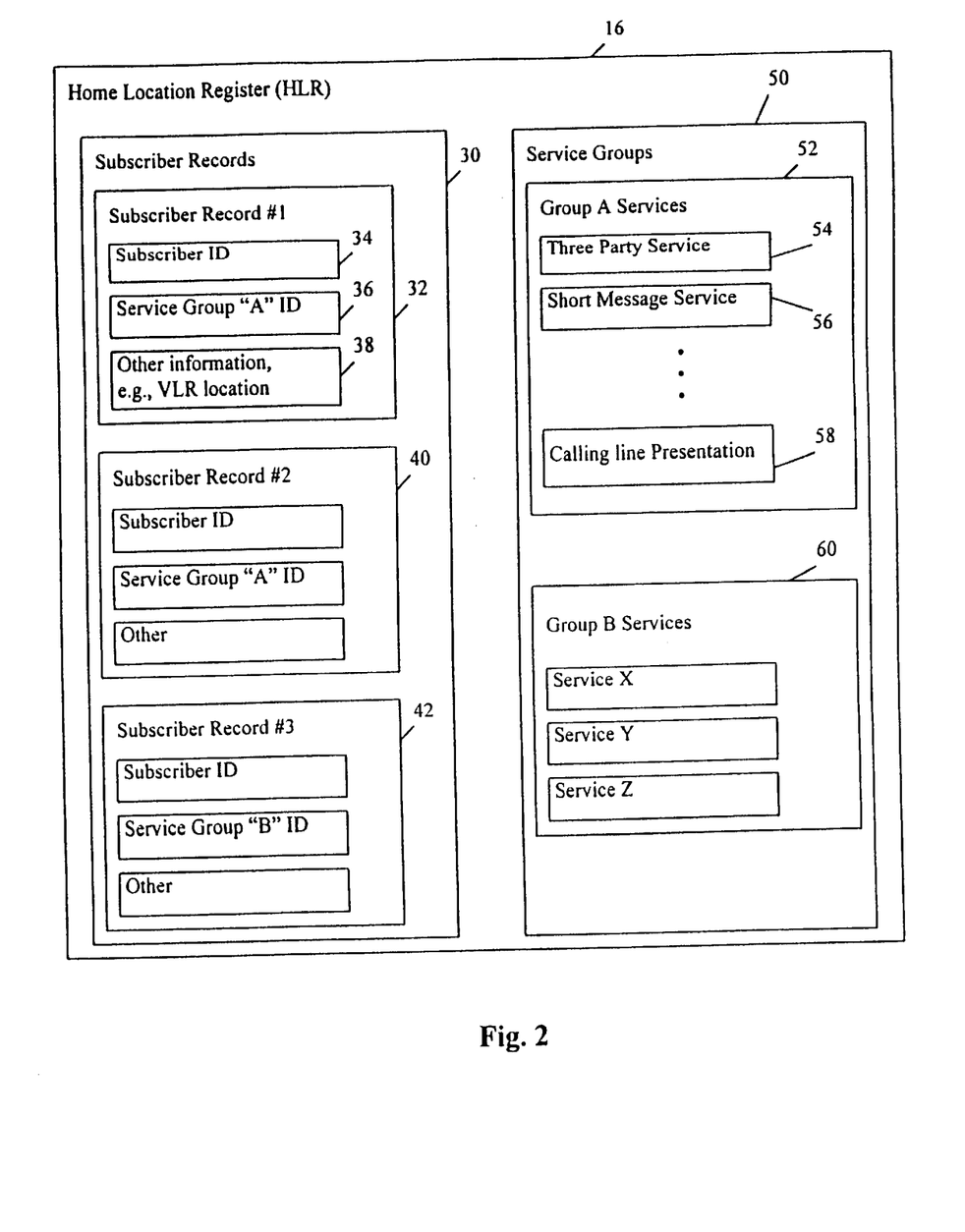
FIG. 2 is a function block diagram of a Home Location Register (HLR) as configured in accordance with an example embodiment of the present invention.

The manner in which the home location register 16 may be configured in accordance with the present invention is now described in conjunction with the function block diagram shown in FIG. 2. The database of the HLR 16 may be divided into two memory sections including a subscriber records database 30 and a group services database 50. The subscriber records database 30 includes individual subscriber records, e.g., 32, 40, and 42, corresponding to each mobile subscriber unit. Each subscriber record includes a subscriber identification (ID) such as the mobile subscriber's MSISDN and IMSI. Each mobile subscriber unit may also include a service group identifier. For example, subscriber record 32 includes a service group "A" identifier 36. Another subscriber record 40 also incorporates a service group "A" identifier, while a third subscriber record 42 incorporates a service group "B" identifier. Each subscriber record may also include other information 38, e.g., corresponding mobile subscriber unit location typically in the form of a VLR or location area identifier.

The group services database 50 includes a plurality of service groups. For purposes of explanation, two service groups 52 and 60 are illustrated with the understanding that many more service groups and services within each group may be included in the group services database 50. Group 52 corresponds to the group "A" services. Example services may include a three party service 54, a short message service 56, and a calling line presentation service 58. The group "B" services 60 may include the same services or other services X, Y, and Z. Service groups may be formulated using any desired parameters. While the detailed description focuses on mobile telephony services, service groups may be formed according to home or working addresses, magazine or television subscriptions, families, demographic data, etc.

The service group identifier in each subscriber record links that subscriber record with a group of services. In other words, a service group "A" identifier links subscriber records 32 and 40 to group A's services 52, and a service group "B" identifier links subscriber record 42 to the group B's services 60. As a result, when a new service is added to a particular service group, all of the subscribers linked to that group through the same service group identifier automatically receive that newly-added service. There is no need to add the same service many times to many subscriber records corresponding to subscribers who desire the new service. Moreover, new subscribers may be added that subscribe to a whole group of services simply by adding new subscriber records that include each subscriber's ID and the service group identifier. There is no need to specify individual services in each subscriber record.

Figure 3:
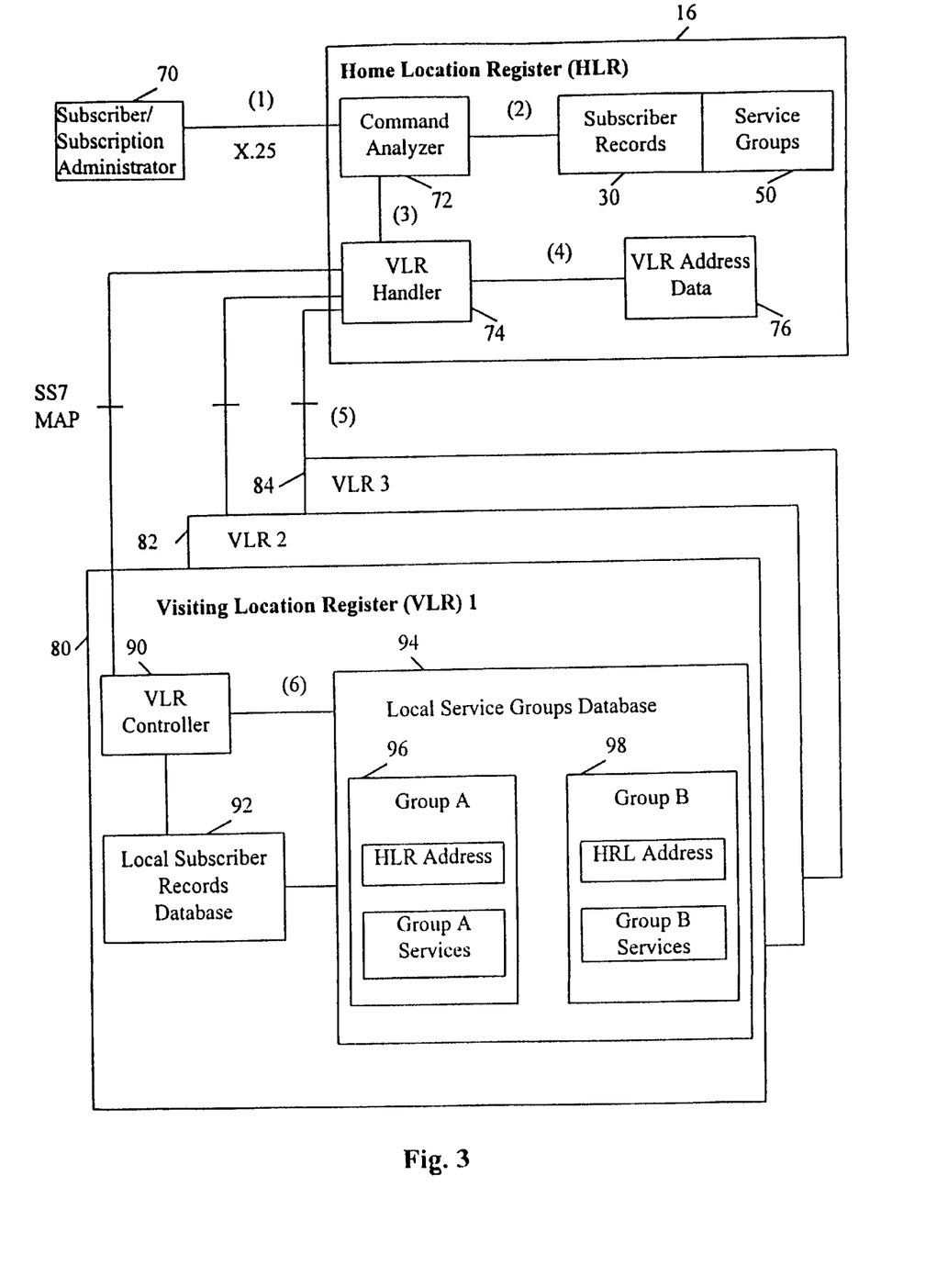
FIG. 3 is a function block diagram illustrating elements for establishing and updating new services and/or subscribers in a mobile communications network in accordance with an example embodiment of the present invention.

FIG. 3 is a function block diagram illustrating how a new service may be added for a group of subscribers in accordance with the present invention. A subscriber/subscription administrator 70 is connected to the home location register 16 over a signaling link connected to a command analyzer 72 in the HLR 16. The signaling between the administrator 70 and HLR 16 may be in accordance with well-defined signaling protocols like X.25. The command analyzer 72 is connected to the subscriber records database 30 and group services database 50 as well as to a VLR handler 74. The VLR handler 74 is connected to a VLR address database 76 and coordinates communications between the HLR 16 and various visiting location registers 80, 82, and 84. In particular, a signaling link is connected from VLR handler 74 with an VLR controller 90 in each of the VLRs 80, 82, and 84. The signaling protocol between the VLR and HLR handlers may be for example in accordance with the Signaling System No. 7 (SS7) mobile application part (MAP) protocol which is supported by a number of well-known, lower SS7 layers, e.g., TCAP, SCCP, MTP, etc. The VLR controller 90 is connected to a local subscriber records database 92 and a local group services database 94. The command analyzer 72, VLR handler 74, and VLR controller 90 may be implemented for example using appropriate data processing hardware and/or software, the specific details of which are not important to the present invention.

When the subscriber/subscription administrator 70 creates a new service to be supported by the mobile communications system 10, the administrator 70 sends an Add New Service command which includes both the new service and a corresponding service group identifier as indicated at reference numeral 1 in FIG. 3. The command analyzer 72 receives the Add New Service command and associated information and adds the new service to the service group in the group services database 50 associated with the specified service group identifier as indicated at reference numeral 2. Because each of the subscriber records in subscriber record database 30 includes a service group identifier, those subscriber records having the service group identifier corresponding to the group in which the new service is added will automatically receive that new service.

As indicated at reference numeral 3, the command analyzer 72 then informs the VLR handler 74 of the new service and corresponding service group ID. The VLR handler 74, at reference numeral 4, accesses the VLR address data for the VLRs 80, 82, and 84. With retrieved VLR addresses, the VLR handler 74, at reference numeral 5, generates Update Subscriber Group commands received by the VLR controller 90 in each VLR 80, 82, and 84. Each Update Subscriber Group command includes the new subscriber service, the associated service group identifier, and the address of th HLR 16. The last information is used in one example embodiment if the service group identifier is HLR dependent.

The VLR controller 90 in each VLR sends an Update Subscriber Group command to the local group services database 94 along with the new service, the service group identifier, and the HLR address indicated at reference numeral 6. Assuming for purposes of example that there are only two service groups A and B, indicated by 96 and 98, that new service and HLR address are added to the group corresponding to the associated service group identifier. Because the subscriber records stored in the local subscriber record database 92 include a service group identifier, each of those local subscriber records is automatically provided the newly added service by virtue of the service group identifier link to the service groups 96 and 98.

Similar type commands, information, and procedure are followed for adding a new subscriber. The subscriber/subscription administrator 70 forwards for each new subscriber to be added to the home location register 16, the new subscriber's identification number(s) and a service group identifier corresponding to the group of services which each newly added subscriber is to receive. The command analyzer 72 updates the subscriber records database 30 to include the newly-added subscribers, and the VLR handler 74 forwards the newly added subscriber information to the VLR controller 90 in each of the visiting location registers 80, 82, and 84. The VLR controller 90 adds the new subscriber records in the local subscriber records database 92.

Figure 4:
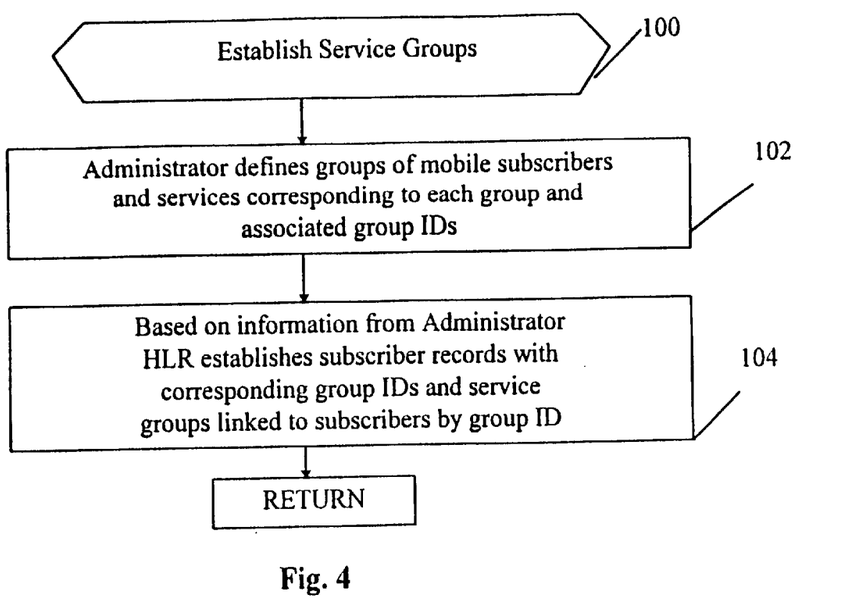
FIG. 4 is a flowchart diagram illustrating example procedures for establishing service groups in accordance with the invention.

The flowchart diagram in FIG. 4 illustrates an example set of procedures for establishing a service group (block 100). The administrator 70 defines groups of mobile subscribers and services to be provided to each group (block 102). In addition, the administrator 70 assigns a service group identifier to each group. Still further, the administrator 70 associates with mobile subscriber identification information (where appropriate) a service group identifier. Based on that information from the administrator, the HLR 16 creates subscriber records 30 and group services 50, such as those shown in FIG. 2, linked to subscriber records by a corresponding group ID (block 104).

Figure 5:
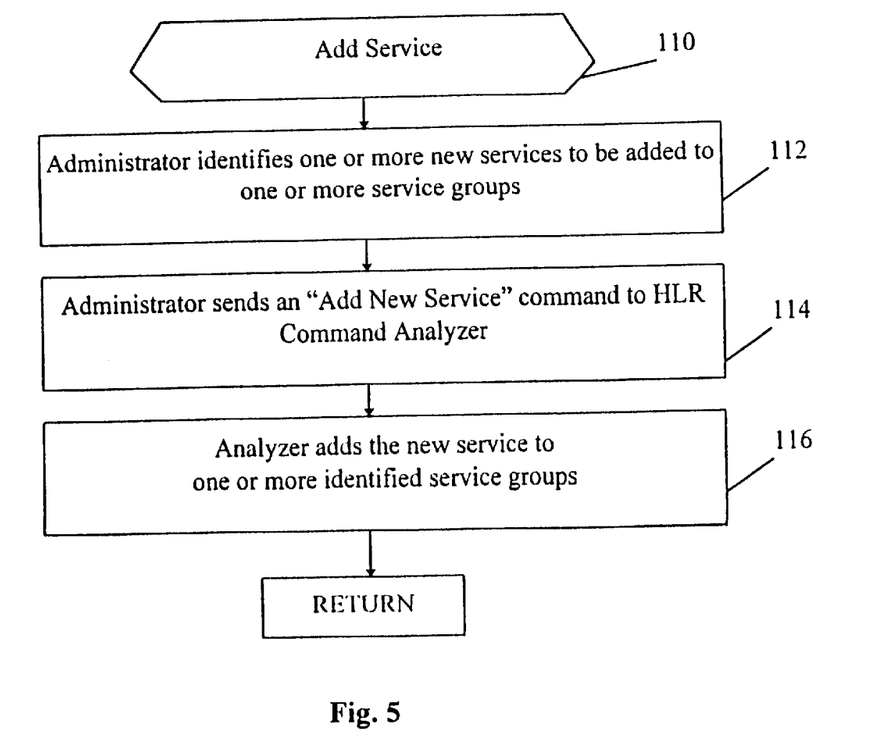
FIG. 5 is a flowchart diagram illustrating example procedures for adding services in accordance with the invention.

FIG. 5 is a flowchart diagram illustrating example procedures for implementing an Add Service Routine (block 110) in accordance with one aspect of the present invention. The administrator 70 identifies one or more new services, e.g., a list of one or more service group identifiers, to be added to one or more service groups (block 112). Administrator 70 then sends an Add Service command and the one or more service group identifiers to the command analyzer 72 in the HLR 16 (block 114). The command analyzer 72 adds the new service to the corresponding one or more of the service groups (block 116).

Figure 6:
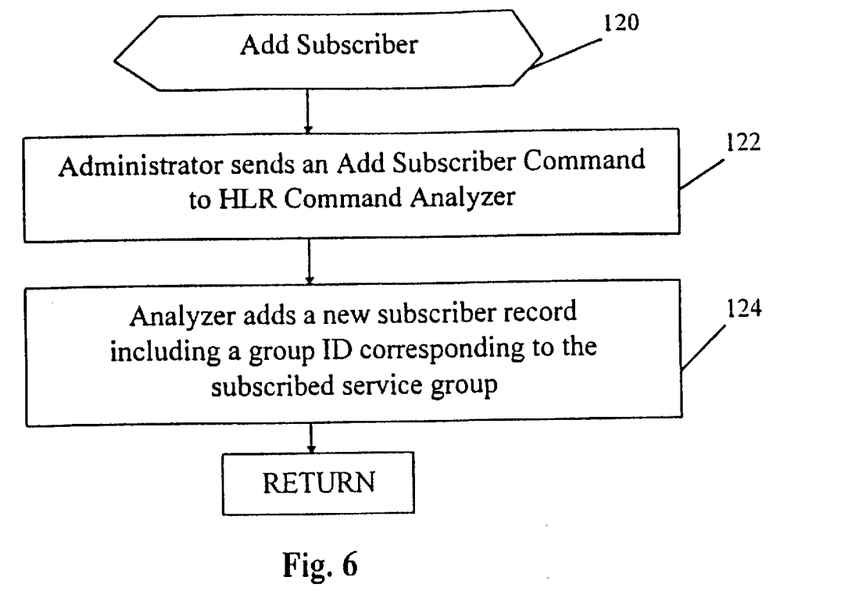
FIG. 6 is a flowchart diagram illustrating example procedures for adding a subscriber in accordance with the invention.

FIG. 6 is a flowchart diagram outlining example procedures for adding a subscriber (block 120) in accordance with one aspect of the present invention. The administrator 70 sends an Add Subscriber command to the command analyzer 72 in the HLR 16 (block 122). The command analyzer 72 adds a new subscriber record including a group ID corresponding to a service group subscribed to by the new subscriber (block 124).

Figure 7:
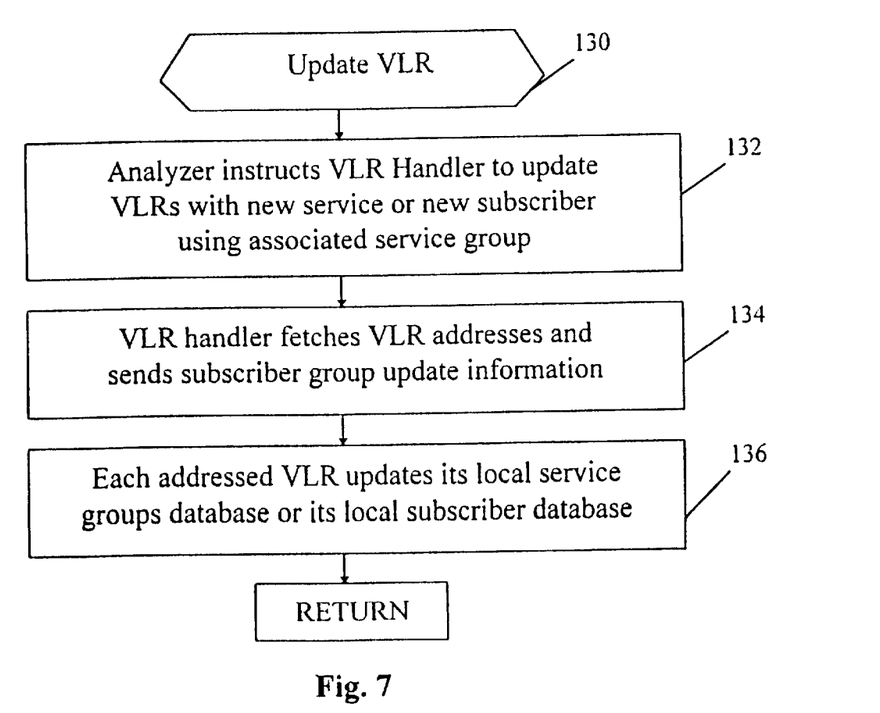
FIG. 7 is a flowchart diagram illustrating example procedures for updating a visiting location register (VLR) in accordance with the invention.

FIG. 7 is a flowchart outlining example procedures for implementing an update VLR routine (block 130) in accordance with one aspect of the present invention. The command analyzer 72 in the HLR 16 instructs the VLR handler 74 to update the VLRs in the mobile communication system with a new service or new subscriber already added to the HLR 16 using the corresponding service group identifier (block 132). The VLR handler 74 in the HLR 16 fetches VLR address information and sends the subscriber group update information (the new service or new subscriber along with the associated service group identifier) to each VLR (block 134). Each VLR employs its VLR controller 90 to update its local service group database 94 or its local subscriber database 92 (block 136).

Figure 8:
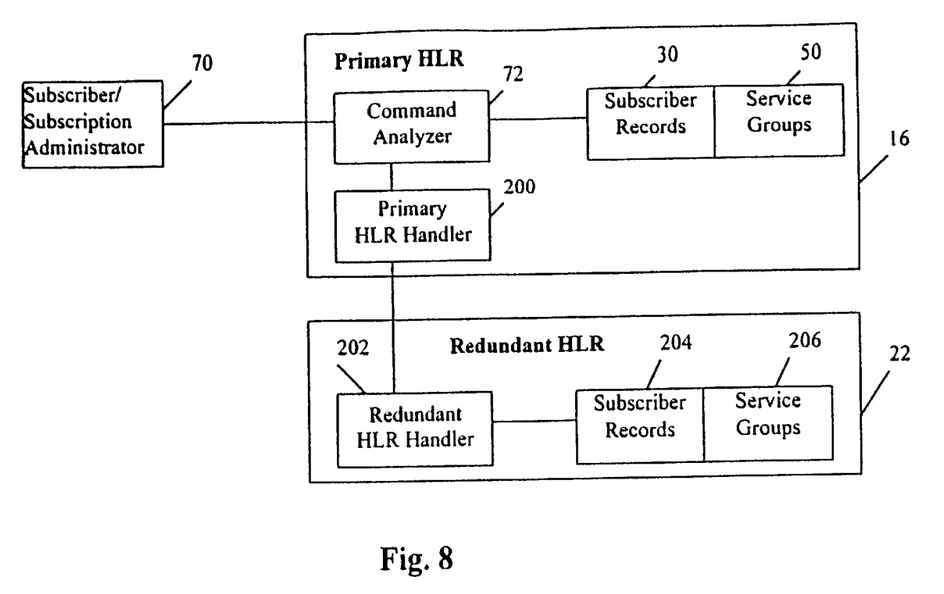
FIG. 8 is function block diagram showing an example application of the present invention to primary and redundant home location registers (HLR)

The present invention may also be readily employed to simplify and streamline database updating procedures for database nodes other than VLRs. One such updating procedure occurs when a mobile communications system employs a redundant or backup HLR, such as the redundant HLR 22 shown both in FIG. 1, now described in more detail in conjunction with FIG. 8. The redundant HLR 22 (RHLR) includes a primary HLR handler 202 connected to a subscriber record database 204 and a service groups database 206 which are analogous to the primary HLR subscriber record database 30 and service groups database 50, respectively. When new services or new subscribers are provided to the primary HLR command analyzer 72, the analyzer 72 informs the redundant HLR 22 of this update via a redundant HLR handler connected to a primary HLR handler 202 in the redundant HLR 22. Using the new service and/or new subscriber identification along with a corresponding service group identifier, the primary HLR handler adds the new subscriber to the subscriber records database 204 or the new service to the service group corresponding to the service group ID forwarded by the redundant HLR handler 200 in service groups database 206.

Figure 9:
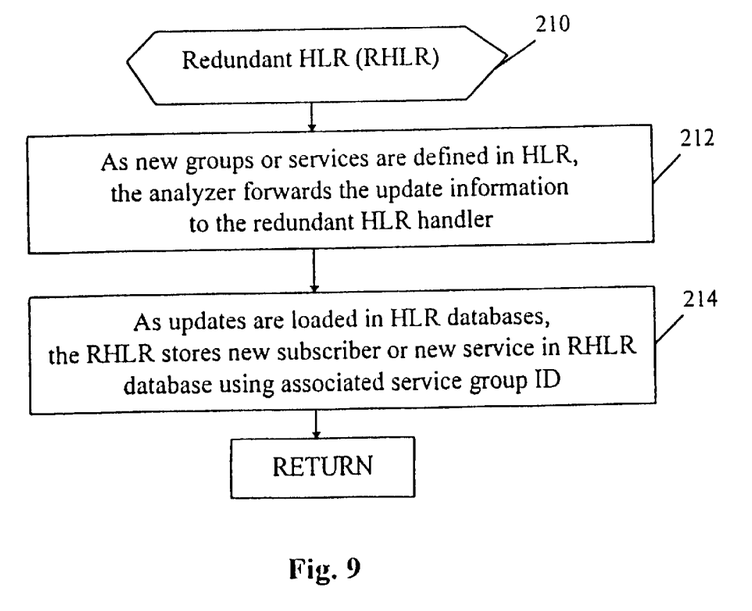
FIG. 9 is a flowchart diagram illustrating example procedures for updating database records in a redundant HLR in accordance with one example application of the invention.

FIG. 9 is a flowchart diagram illustrating example procedures for implementing a redundant HLR routine (block 210) in accordance with one aspect of the present invention. As new groups or services are defined and updated in the HLR, the command analyzer 72 forwards this update information, (i.e., the new service/subscriber and corresponding group identifier), to the redundant HLR handler 200 (block 212). In this way, as the updates are loaded in the respective HLR databases 30 and 50, the primary HLR handler 202 in the redundant HLR 22 stores the new subscriber or new service in the RHLR subscriber records database 204 or RHLR service groups database 206, respectively, using the associated service group identifier (block 214).

Figure 10:
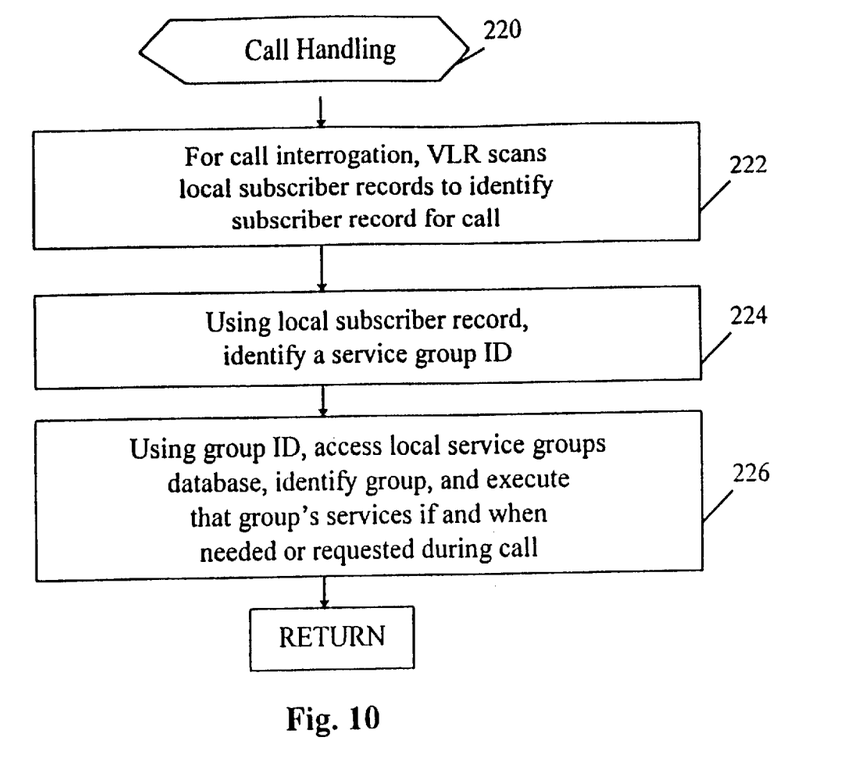
FIG. 10 is a flowchart diagram illustrating example procedures relating to handling calls which trigger one or more group services.

Call handling procedures including call setup and rendering of mobile services incorporating the present invention may be implemented using conventional procedures with a relatively minor modification as will now be explained in conjunction with the call handling routine 220 illustrated in flowchart format in FIG. 10. For a call terminating in the mobile communications system 10, conventional call interrogation procedures are employed to locate the called mobile communications unit. When the gateway mobile switching center 12 identifies the mobile switching center 14 and visiting location register servicing the location area in which the called mobile communications unit is currently located, that VLR scans its local subscriber records database 92 using the mobile subscriber identification information extracted from the incoming call to identify the corresponding local subscriber record (block 222). From that local subscriber record, a handler in the visiting global location register identifies a service group identifier (block 224). Using the service group identifier, the VLR controller 90 accesses the local service groups database 94, identifies the group corresponding to that service group identifier, and executes the services as requested or otherwise appropriate in that accessed group (block 226). As already described above, the service group identifier provides an immediate link between each subscriber record and a service group which includes the subscribed services.

The present invention is also advantageously employed in situations where subscriber or service data in a mobile communications database are lost or corrupted such as for example when power is lost. Example procedures for restoring accurate subscriber and service data to such a database is now described in conjunction with the Restore VLR routine (block 230) shown in FIG. 11. The HLR sends service group information to the VLR along with a corresponding service group identifier (block 232). The HLR also sends to the VLR current subscriber records along with any service group identifier for each subscriber record (block 234).

Figure 11:
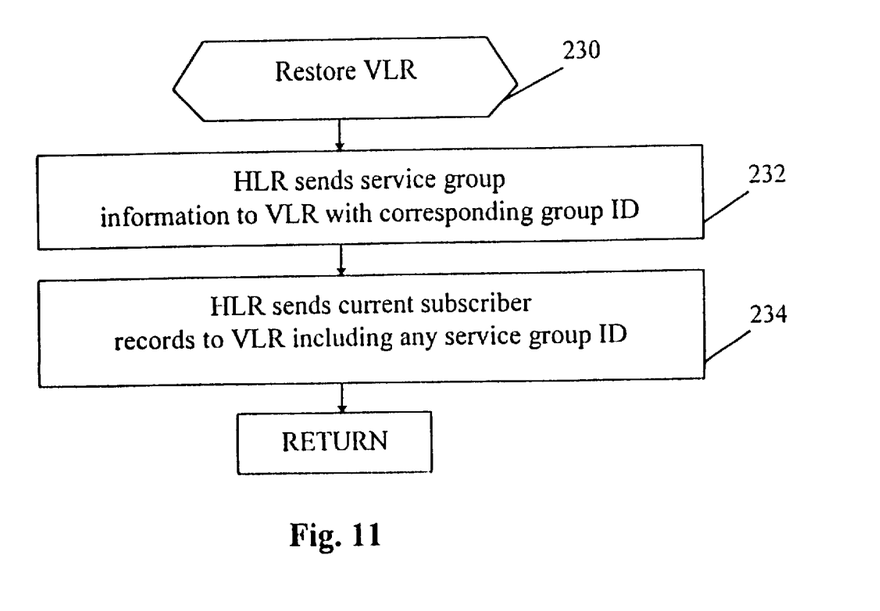
FIG. 11 is a flowchart diagram illustrating example procedures for restoring information to a corrupted mobile communications database.

In this example, a huge amount of data would normally have to be communicated from the HLR to the VLR if there are a large number of subscribers and/or services. In other words, if such data were restored on an individual subscriber basis, each individual subscriber record and all the services to which that individual subscriber subscribes would have to be communicated from the HLR to the VLR. However, because many subscribers likely subscribe to the same services and therefore can be grouped together, the present invention dramatically reduces the amount of data that must be transferred from the HLR to the VLR and ultimately stored in the VLR. Namely, the "common" sets or groups of services are transmitted and stored only once. Association of an individual subscriber record with one of those groups is accomplished by merely sending a service group identifier along with the subscriber record.

Figure 12:
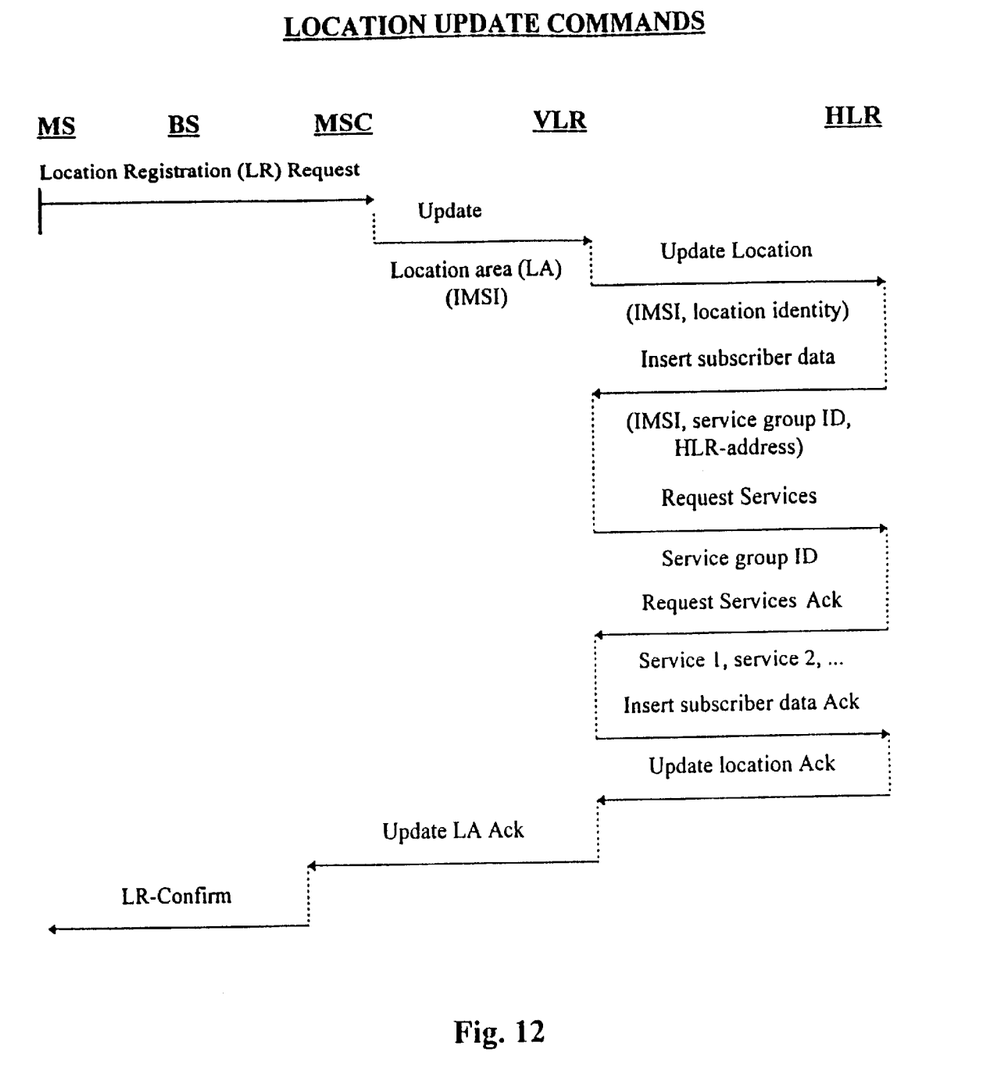
FIG. 12 is a signal flow diagram showing example location update commands when a mobile subscriber enters a new location area incorporating certain aspects of the present invention.

Still further, the present invention may advantageously be employed in the context of location update procedures as a mobile communications unit is traveling between location areas in the mobile communications system 10. FIG. 12 illustrates an example of such location update commands between various entities in the mobile communications network.

As a mobile station (MS) moves into a new location area, it generates and forwards via the base station (BS) to the mobile switching center (MSC) a location registration request. In response, the MSC generates an update location area (LA) command to the VLR corresponding to that location area including the mobile station IMSI identifier. The VLR then updates the mobile stations subscriber record to indicate its current location area and provide that location update information to the HLR. In accordance with the present invention, the HLR provides the VLR subscriber data including the subscriber's identifier, e.g., IMSI, service group ID, and HLR address if the service group identifier is HLR dependent. In atypical situations, if the VLR does not recognize the service group ID provided by the HLR, the VLR requests group services from the HLR by returning that service group identifier to the HLR. In response, the HLR acknowledges that request for services and sends the services, e.g., service 1, service 2, . . ., associated with that service group identifier. The VLR also continues with the typical location updating procedures including an acknowledgment to the Insert Subscriber Data command from the HLR. The HLR sends an acknowledgment of the location of completion of the location update procedure which is forwarded via the VLR, MSC, and BS to the mobile station.

In another embodiment of the present invention directed to individual services rather than established groups of subscribers, a service identifier is assigned to a new service to be supported by a mobile radio communications system. The new service is established for a plurality of mobile subscribers using that service identifier. Rather than storing the service itself in each subscriber record, the new service is provided to the mobile subscribers by incorporating the service identifier into the mobile subscriber database records of each mobile subscriber subscribing to the new service.

Figure 13:
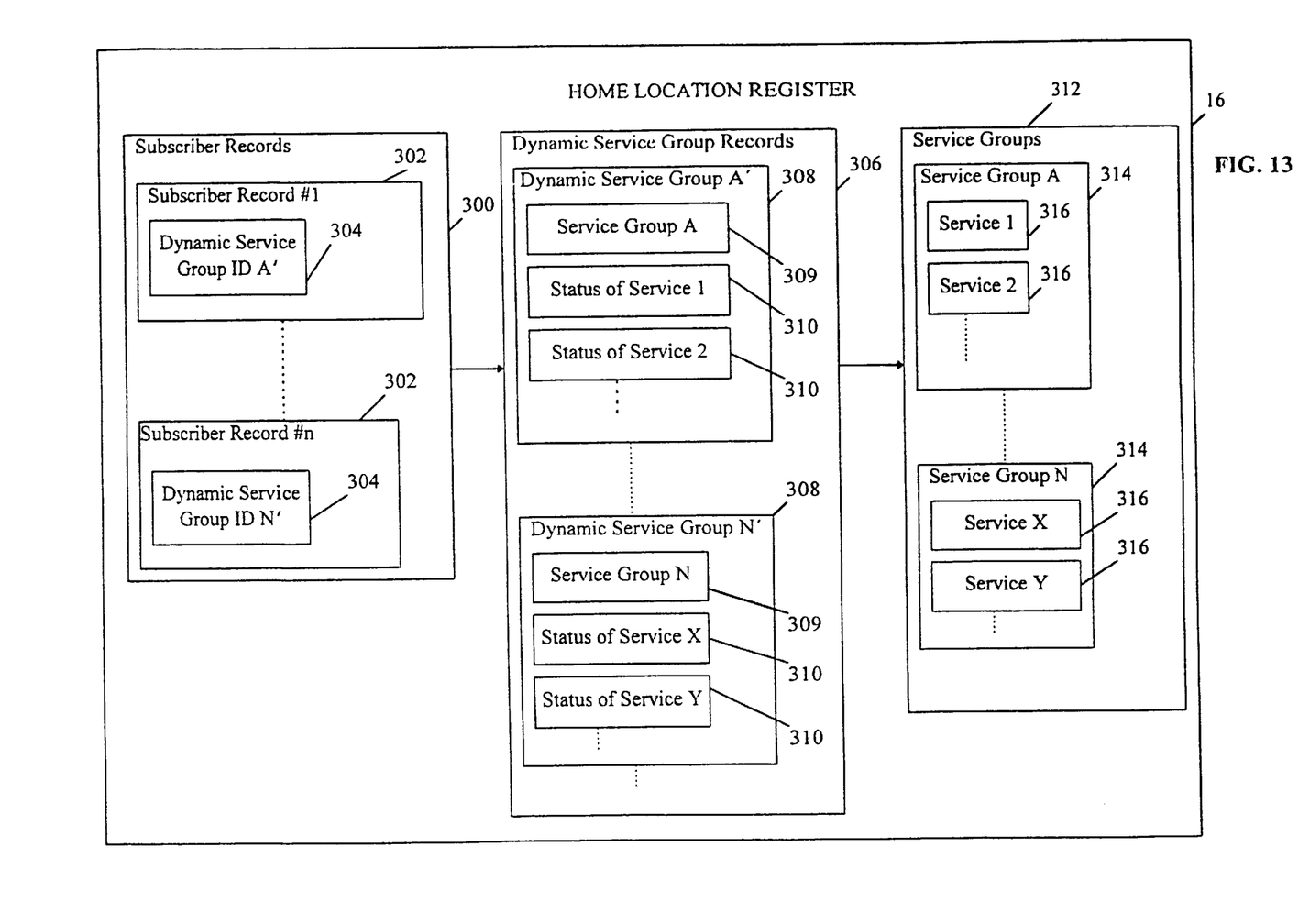
FIG. 13 is a function block diagram illustrating elements for establishing and updating services and/or subscribers in a mobile communications network in accordance with another example embodiment of the present invention.

Another example embodiment of the present invention will now be described in conjunction with FIGS. 13 and 14. For certain mobile subscriber services, the subscriber may selectively and periodically activate/deactivate a subscribed service in accordance with the current wishes of that subscriber. A "static" service group may be less effective at representing both the services and the current condition of those services, e.g., activated or deactivated, as currently indicated by individual subscribers. The present invention accommodates this problem by providing a dynamically allocated service group identity that contains information about the service groups as well as the status of each service within that service group.

The dynamic service group identity is allocated by the HLR and is provided to the VLR in the same manner as already described above. In the home location register 16 shown in FIG. 13, there are three separate databases (or alternatively differently sections of a single database) including a subscriber records database 300, a dynamic service group records database 306, and a service groups database 312. They dynamic service group records database 306 includes several dynamic service groups 308 such as group A' through dynamic service group N'. Each of the dynamic service group records 308 identifies a corresponding service group using a service group identifier 309 and includes a configuration of status information 310 for services in that identified service group. For example, the dynamic service group record A' includes an identifier that identifies service group A in the service groups database 312. The status of each of the service group A services 316, i.e., service 1, service 2, etc. is stored in the dynamic service group A' record. Accordingly, rather than individual subscriber records referring to service group IDs, in this more dynamic embodiment, each subscriber record 302 includes a field containing a dynamic service group ID 304 that links that subscriber record with a dynamic service group record 308.

Consider the following example, assume that a subscriber subscribes to a call waiting service and a three party service and that initially the call waiting service is "inactive" and the three party service is "active". These two services and their respective states therefore comprise a first dynamic service group. The subscriber's record 302 in the subscriber record database 300 references the first dynamic service group in database 306 via corresponding dynamic group ID A' which in turn is linked to service group A in the service group database 312.

If the HLR receives a command indicating that the subscriber now wants to activate the call waiting service, the HLR locates the subscriber's record 302 and accesses the first dynamic service group identified in the subscriber's record. The HLR also scans all of the dynamic service groups in database 306 to identify any existing dynamic service group record 308 that includes the call waiting and three party services both in an active state, i.e., the newly requested service/status combination. If such a second dynamic service group record is identified, the subscriber's record 302 is updated to replace the first dynamic service group ID with the second dynamic service group ID.

If none of the currently existing dynamic service group records correspond to the current service/status combination requested by the subscriber, a new dynamic service group record 308 corresponding to the requested service/status combination is generated and stored in the dynamic service group records database 306. Such a new record may be generated by copying the contents of the first dynamic service group record and then changing the status information as requested by the subscriber and providing that new record with an ID. In any event, the subscriber's record is then updated with the newly generated dynamic service group ID.

Figure 14:
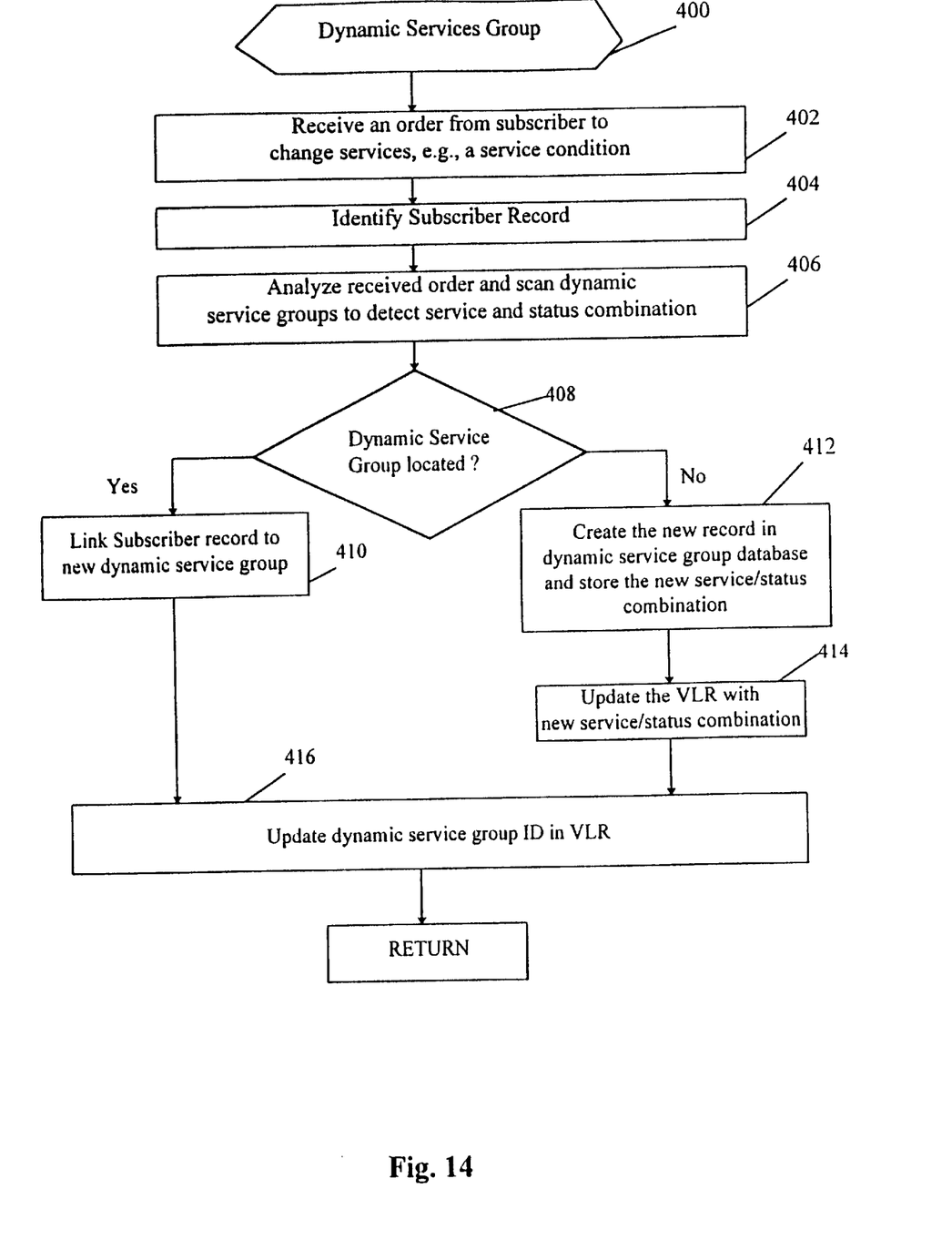
FIG. 14 is a flowchart illustrating example procedures for service/status combinations in accordance with the example embodiment shown in FIG. 13.

FIG. 14 illustrates in flowchart form example procedures for implementing the dynamic service group embodiment described above in conjunction with FIG. 13 (block 400). The HLR receives an order from the subscriber to change services, e.g., a changed condition or status of a service (block 402). The HLR identifies the subscriber's record in the subscriber record database 300 (block 404). The HLR analyzes the subscriber's order and scans the dynamic service group database 306 to detect (if available) the service/status combination requested by the subscriber (block 406). A decision is made in block 408 if the requested dynamic service group is present in the dynamic service group database 306. If so, the subscriber record is updated to link that record with the new dynamic service group record 308 (block 410). If the requested dynamic service group is not present in the dynamic service group database 306, the HLR creates a new dynamic service group record 308 corresponding to the service/status combination requested by the subscriber (block 412). The HLR then updates the VLR with the new service/status combination (block 414). After performing both functions in blocks 410 and 414, the HLR updates the dynamic service group identification information in the VLR.

In addition to the advantages already noted above, the present invention also permits a telephone network operator to provide new services to all subscribers on a temporary basis such as at the time new services are introduced. This allows the operator to market the services free of charge for a few days to expose all subscribers hoping that at least some subscribers will be interested purchasing the new service. This kind of marketing technique is readily implemented in the present invention without increasing signaling volume simply by adding the new service to all of the group services in the service group database. Moreover, the present invention also permits the HLR to easily and efficiently generate backup data records, e.g., to hard disk or magnetic tape in a relatively short time period.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a communications system, a method comprising the steps of:

defining a group of mobile subscribers;

assigning a supplementary service group identifier to each member of the group; and establishing one or more supplementary mobile subscriber service to which mobile subscribers may subscribe, in addition to basic mobile connection service, for the group of mobile subscribers associated with the supplementary service group identifier, wherein a change to the established group supplementary mobile subscriber services is automatically implemented for the mobile subscribers in the group.

2. The method in claim 1, wherein supplementary services group identifier links each member with the established group of supplemental mobile subscriber services.

3. The method in claim 1, wherein the communications system includes a mobile communications database including a first section storing mobile subscriber data records for plural mobile subscribers, each record including a mobile subscriber identifier, and for members of the supplementary service group, the supplementary service group identifier.

4. The method in claim 3, wherein the mobile communications database includes a second section storing the one or more supplementary services established for the group, the method further comprising:

providing to each member the group supplementary mobile subscriber services using the group identifier by linking each group member's subscriber record stored in the first section with the group services stored in the second section.

5. The method in claim 2, further comprising:

providing a new supplementary mobile subscriber service to each group member by associating the new supplementary mobile subscriber service with the group identifier.

6. The method in claim 2, further comprising:

adding a new member to the group by associating the supplementary service group identifier with a mobile subscriber record corresponding to the new member.

7. The method in claim 3, the method further comprising:

updating service information at another database by sending a new supplementary mobile subscriber service and the supplementary service group identifier or a new subscriber and the supplementary service group identifier to the other database.

8. The method in claim 3, wherein the mobile communications database is a home location register (HLR) and the mobile communications system includes one or more visiting location registers (VLRs) corresponding to one or more location areas in the mobile communications system and storing subscriber records for mobile subscribers currently registered in the one or more location areas, the method further comprising:

updating supplementary mobile subscriber service information in the one or more VLRs to incorporate a new supplementary mobile subscriber service or a new mobile subscriber using the supplementary service group identifier.

9. The method in claim 8, wherein the updating step includes the HLR sending the new supplementary mobile subscriber service or the new mobile subscriber along with the supplementary service group identifier to the one or more VLRs.

10. The method in claim 9, wherein the HLR sends the new supplementary mobile subscriber service along with the supplementary service group identifier only once to update the services to be provided to all members of the group.

11. The method in claim 8, wherein when a mobile belonging to the group registers in a new location area, the method further comprises:

performing a mobile subscriber location update procedure including the HLR sending to the VLR corresponding to the new location area the mobile's identification and the supplementary service group identifier.

12. The method in claim 8, wherein the mobile communications system includes a redundant HLR, the method further comprising:

updating the redundant HLR using the supplementary service group identifier.

13. The method in claim 12, the method further comprising:

transmitting to the redundant HLR a new supplementary mobile subscriber service added to the group along with the supplementary service group identifier.

14. The method in claim 8, further comprising:

when a mobile belonging to the group registers in a new location area, performing a mobile subscriber location update procedure to update the VLR corresponding to the new location area including the HLR sending the supplementary service group identifier to the VLR.

15. The method in claim 2, further comprising:

when data stored in the mobile communications database is lost, restoring mobile subscriber service information in the mobile communications database using the supplementary service group identifier and the one or more supplementary mobile subscriber services associated with the supplementary service group identifier.

16. In a mobile radio communications network, apparatus for providing supplementary mobile subscriber services to which mobile subscribers may subscribe in addition to a basic mobile subscriber connection service, comprising:

a home location register (HLR) node that defines first and second groups of mobile subscribers and assigns to each member of the first and second groups a corresponding first and second supplementary service group identifier, wherein the mobile radio communications network provides supplementary mobile subscriber services to members of the first and second groups using the corresponding first and second supplementary service group identifiers.

17. The apparatus in claim 16, wherein the first and second group identifiers link members of the first and second groups with corresponding first and second sets of supplementary mobile subscriber services.

18. The apparatus in claim 16, wherein the HLR includes:

a first data table storing mobile subscriber data records for plural mobile subscribers, each record including a mobile subscriber identifier, and for members of the first and second groups, the corresponding first and second supplementary service group identifiers, and a second data table storing a first set of supplementary mobile subscriber services corresponding to the first supplementary service group identifier and a second set of supplementary mobile subscriber services corresponding to the second supplementary service group identifier.

19. The apparatus in claim 16, wherein a new supplementary mobile subscriber service is provided to the members of first group by adding the new supplementary mobile subscriber service to the first set of supplementary mobile subscriber services.

20. The apparatus in claim 16, wherein a new member is added to the first group by associating the first supplementary service group identifier with a mobile subscriber record corresponding to the new member.

21. The apparatus in claim 16, further comprising:

another database coupled to the HLR, wherein the HLR updates the other database by sending a new supplementary mobile subscriber service or a new subscriber along with one of the supplementary service group identifiers.

22. The apparatus in claim 21, wherein the other database is a visiting location register (VLR) corresponding to a location area in the mobile communications system.

23. The apparatus in claim 21, wherein the other database is a redundant HLR.

24. A mobile subscriber database node for communicating with other nodes in a mobile communications system including mobile communications units, comprising:

a first memory area storing mobile subscriber records including a mobile unit identifier and a first supplementary service group identifier for those mobile units that are members of a first supplementary service group or a second supplementary service group identifier for those mobile units that are members of a second supplementary service group;

a second memory area storing a first set of supplementary mobile subscriber services associated with the first supplementary service group and a second set of supplementary mobile subscriber services associated with the second supplementary service group, where supplementary services may be selectively subscribed to in addition to basic mobile connection service; and data processing circuitry coordinating communications to and from the mobile subscriber database node, and during call handling operations, linking mobile subscriber records containing a supplementary service group identifier to a corresponding set of supplementary mobile subscriber services stored in the second memory area.

25. The mobile subscriber database node in claim 24, wherein the data processing circuitry adds a new supplementary subscriber service to the first set of supplementary mobile subscriber services stored in the second memory area, the newly added supplementary subscriber service thereafter being provided to each member of the first supplementary service group without updating each mobile subscriber record of the first supplementary service group members.

26. The mobile subscriber database node in claim 24, wherein the data processing circuitry adds a new subscriber to the first supplementary service group by storing the first supplementary service group identifier in the new subscriber's mobile subscriber record.

27. The mobile subscriber database node in claim 24, wherein the data processing circuitry updates another database with a new subscriber added to one of the first and second supplementary service groups by sending to the other database the new subscriber identification and a supplementary service group identifier.

28. The mobile subscriber database node in claim 24, wherein the data processing circuitry updates another database with a new supplementary service added to one of the first and second sets of supplementary services by sending to the other database the new service and a supplementary service group identifier.

29. The mobile subscriber database node in claims 27 or 28, wherein the other database includes:
    a memory having:
        a first memory area storing mobile subscriber records including the mobile unit identifier and the first supplementary service group identifier for those mobile units that are members of the first supplementary service group or the second supplementary service group identifier for those mobile units that are members of the second supplementary service group, and
        a second memory area storing the first set of supplementary mobile services associated with the first supplementary service group and a second set of supplementary mobile services associated with the second supplementary service group; and
    data processing circuitry for coordinating communications with the mobile subscriber database node.

30. The mobile subscriber database node in claims 29, wherein mobile subscriber database node is a home location register (HLR) node and the other database is a visiting location register (VLR).

31. The mobile subscriber database node in claims 29, wherein mobile subscriber database node is a home location register (HLR) node and the other database is a redundant home location register.

32. In a mobile radio communications system including a mobile communications database storing mobile subscriber data records for plural mobile subscribers, a method comprising the steps of:
    assigning a supplementary service group identifier to a new supplementary mobile subscriber service selectively supported by the mobile radio communications system in addition to basic mobile connection service, and
    establishing the new supplementary mobile subscriber service in the mobile radio communications system for a plurality of mobile subscribers using the supplementary service group identifier.

33. The method in claim 32, wherein the establishing step includes defining the new supplementary mobile subscriber service at the mobile communications database using the supplementary service group identifier.

34. The method in claim 33, wherein the establishing step includes the mobile communications database updating supplementary service information at another database using the supplementary service group identifier.

35. The method in claim 33, further comprising:
    providing the new supplementary mobile subscriber service to a group of mobile subscribers using the supplementary service group identifier stored in the mobile communications database.

36. The method in claim 33, wherein the establishing step includes:
    incorporating the supplementary service group identifier in ones of the mobile communications database records corresponding to a group of mobile subscribers subscribing to the new supplementary mobile subscriber service.

37. The method in claim 36, wherein the mobile communications database is a home location register (HLR) that stores a mobile subscriber identification and the supplementary service group identifier in each mobile subscriber's data record belonging to the group.

38. The method in claim 37, wherein the mobile communications system includes one or more visiting location registers (VLRs) corresponding to one or more location areas in the mobile communications system storing subscriber records for mobile subscribers currently registered in the one or more location areas, the method further comprising:
    updating supplementary mobile subscriber service information in the one or more VLRs to incorporate the new supplementary mobile subscriber service using the supplementary service group identifier.

39. The method in claim 38, wherein the updating step includes the HLR sending the new supplementary mobile subscriber service along with the supplementary service group identifier to the one or more VLRs.

40. The method in claim 39, wherein the HLR sends the new supplementary mobile subscriber service along with the supplementary service group identifier only once to update plural VLR subscriber records to include the new supplementary mobile subscriber service.

41. The method in claim 39, further comprising:
    when a mobile belonging to the group registers in a new location area, performing a mobile subscriber location update procedure to update the VLR corresponding to the new location area including the HLR sending to the VLR the supplementary service group identifier.

42. The method in claim 41, further comprising:
    the VLR determining if the supplementary service group identifier is employed in the VLR; and
    if not, the VLR requesting the HLR to transfer the mobile subscriber data corresponding to the supplementary service group identifier.

43. The method in claim 37, wherein the mobile communications system includes a redundant HLR, the method further comprising:
    updating the redundant HLR using the supplementary service group identifier.

44. The method in claim 33, further comprising:
    when data stored in the mobile communications database is lost, restoring mobile subscriber service information using the supplementary service group identifier.

45. A mobile subscriber database node for communicating with other nodes in a mobile communications system including mobile communications units, comprising:
    memory storing mobile subscriber records including a mobile unit identifier and a first service group identifier for those mobile units that are members of the first service group or a second service group identifier for those mobile units that are members of the second service group;

memory storing a first set of mobile services associated with the first service group and a second set of mobile services associated with the second service group, where at least one of the services associated with each of the first and second set of mobile services includes an associated service condition; and data processing circuitry coordinating communications to and from the mobile subscriber database node, and during call handling operations, for linking mobile subscriber records containing a service group identifier to a corresponding set of mobile services stored in the second memory area;

wherein the memory includes a dynamic service group database including plural dynamic service group records where each dynamic service group record is linked to one of the sets of services and specifies a set of conditions for some of those services.

46. The mobile subscriber database node in claim 45, wherein the data processing circuitry updates individual ones of the mobile services with corresponding service condition changes.

47. The mobile subscriber database node in claim 45, wherein the memory stores subscriber records, some of the subscriber records including a dynamic service group record identifier.

48. The mobile subscriber database node in claim 47, wherein the memory include plural dynamic service group records linked to a same one of the sets of services but specify different conditions for those services.

49. The mobile subscriber database node in claim 48, wherein the data processing circuitry adds a new dynamic service group record to accommodate a new configuration of service conditions.

\* \* \* \* \*